United States Patent Office 2,767,205
Patented Oct. 16, 1956

2,767,205

HARDENING OXIDIZED MICROCRYSTALLINE WAX

William E. Thompson, Wallingford, Pa., assignor to Sun Oil Company, Philadelphia, Pa., a corporation of New Jersey No Drawing. Application February 27, 1953,
Serial No. 339,458

4 Claims. (Cl. 260—452)

This invention relates to the treatment of oxidized microcrystalline wax in order to increase its hardness.

It is known in the art to partially oxidize microcrystalline petroleum wax to obtain a product mixture containing carboxylic products of oxidation, generally in admixture with unsaponifiable products of oxidation and with unoxidized wax. Such product mixtures are useful, for example, as constituents of wax polish compositions. However, it is generally required that oxidized microcrystalline wax should be relatively hard in order to be suitable for use in wax polish compositions. Thus, it is generally preferred that oxidized microcrystalline waxes for use in polish compositions should have penetration ratings at 77° F. (A. S. T. M. D5–25) of 5 or less. However, it not infrequently happens that oxidized microcrystalline wax compositions, as obtained by oxidation of microcrystalline wax to a saponification number of, say, 50 to 150, or thereabouts, will have penetrations substantially above 5 and often as much as 10 or more.

The present invention provides an unobvious manner of increasing the hardness, i. e., decreasing the penetration, of oxidized microcrystalline wax. It has been discovered that the hardness may be substantially increased by contacting an oxidized microcrystalline wax product mixture, without previous separation of carboxylic acid reaction products from other constituents of the mixture, with silica gel with resultant adsorption by the gel of certain constituents of the oxidized wax mixture, the unadsorbed material being substantially harder than the charge to the gel treatment. It has further been discovered that the increased hardness is obtained with a relatively small decrease in the saponification number of the oxidized wax, so that the treated product has still sufficiently high saponification number to be highly suitable for use in wax polish compositions.

The contacting of oxidized microcrystalline wax with silica gel may be carried out in any suitable manner. For example, a charge material consisting essentially of the molten oxidized wax may be percolated through a column of the gel to obtain an effluent liquid which upon solidification will be found to have greater hardness than an oxidized wax solidified without previous silica gel treatment. The temperature of contacting is preferably not substantially more than 50° F. higher than the melting point of the oxidized wax, since high temperatures tend to discolor the oxidized wax. Typical melting points of oxidized microcrystalline waxes are in the range from 180° F. to 210° F.

The silica gel treatment of the present invention may be applied to an oxidized microcrystalline wax obtained by any suitable known method of partially oxidizing microcrystalline wax to obtain products having saponification number greater than that of the oxidation charge. Typical saponification numbers of such products are those in the range from 50 to 150. Generally, the saponification number and the penetration both gradually increast during the oxidation. For example, the saponification number may increase from 0 to 65 while the penetration increases from 5 to 9. Treatment of the oxidized wax with silica gel according to the invention may decrease the saponification number to 60 and the penetration to 5 again. It is noted that the process of the present invention involves only a partial reduction of the saponification number of the oxidized wax, e. g. to a saponification number in the range from 30 to 140, the reduction preferably being not greater than 40 percent, whereas unpredictably, the penetration is often reduced all the way to a level as low as or lower than the original penetration prior to oxidation.

After silica gel has been used according to the invention to adsorb certain constituents from oxidized microcrystalline wax, it can if desired be regenerated for further use by removal of the adsorbed constituents in any suitable manner. For example, the adsorbed constituents can be removed by contacting the silica gel with a desorbing liquid. Suitable desorbing liquids include liquids having substantial solvent action for partially oxidized hydrocarbons and having a relatively high degree of adsorbability on silica gel, though the desorbing liquid need not have a higher degree of adsorbability than the adsorbed oxidation products. Preferably, the desorbent used has an adsorption index, as defined in U. S. Patent 2,585,492, issued February 12, 1952, to John L. Olsen, of at least 20 though lower adsorption indices are operative, and even saturated hydrocarbons, having adsorption indices of about 0, as there defined, may be used.

Suitable desorbing agents for removal of the adsorbed oxidation products include benzene, toluene, pyridine, diisobutyl ketone, ethyl alcohol, butyl alcohol, ethyl acetate, saturated hydrocarbons, etc., and other organic liquids having substantial solvent action for partially oxidized hydrocarbons. The desorbing agent can be removed from the silica gel prior to re-use of the latter for contacting with ozidized wax; the removal can be accomplished by steaming the silica gel at elevated temperature, e. g., above 250° F., and prevents the desorbing agent from interfering with the re-use of the gel for such contacting.

According to the present invention, the process is carried out in such a way that the desorbing agent, or any other volatile solvent, does not become admixed with the unadsorbed oxidized wax which becomes the product of the process. By preventing such admixture, the necessity of subsequent stripping of solvent or desorbing agent from the product is eliminated.

The properties of the product or products obtained according to the present invention can be controlled by regulation of the relative proportions of adsorbed material and unadsorbed material; generally, the higher the proportion of the adsorbed to unadsorbed material, the lower will be the penetration and saponification number of the unadsorbed material. The proportion of adsorbed to unadsorbed material may be regulated by proper choice of the amount of silica gel used and the rate of contact with and separation of oxidized wax from the gel. Generally, large amounts of silica gel and low rates of contacting result in high ratios of adsorbed to unadsorbed material. Choice of proper variables for obtaining any desired results is, in the light of the present specification, within the ability of a person skilled in the art.

The following example illustrates the invention:

Microcrystalline wax having penetration at 77° F. (A. S. T. M. D5–25) of 6 and initial saponification number, in mg. of KOH per gram, of zero was partially catalytically oxidized in liquid state at 250° F. with free-oxygen containing gas to obtain a product, liquid at the oxidation temperature, having saponification number of 65, penetration at 77° F. of 9, and N. P. A. color of 4 plus. 187 grams of the molten oxidation product, without any intervening treatment, were percolated through a column containing 40 grams of silica gel. The first 44 grams of the effluent product had penetration at 77° F. of about 5, saponification number of about 60, and N. P. A. color of 5. The next 44 grams of effluent product had penetration of about 6, saponification number of about 65, and N. P. A. color of 4½. The next 55 grams of effluent product had penetration of about 9 and saponification number of about 68. The remainder of the charge to the gel-treating step, amounting to 44 grams, was adsorbed by the gel and can be recovered therefrom by use of a suitable desorbent such as benzene. After desorption, the gel can be used for treatment of additional oxidized wax.

The following table shows the properties of the products obtained as compared with the unoxidized wax, and the oxidized wax prior to treatment according to the invention.

|  | Saponification Number | Penetration at 77° F | Weight in Grams |
| --- | --- | --- | --- |
| Unoxidized wax | 0 | 6 |  |
| Oxidized Wax Prior to Treatment | 65 | 9 | 187 |
| Products of Treatment: |  |  |  |
| First | 60 | 5 | 44 |
| Second | 65 | 6 | 44 |
| Third | 68 | 9 | 55 |

The first and second products each constitute about 23.5 weight percent of the oxidized wax prior to treatment, and each one has saponification number which is at an advantageously high level and penetration number which is advantageously reduced from that of the oxidized wax prior to treatment.

The third product has advantageously high saponification number, but its penetration is as high as that of the oxidized wax prior to treatment. Therefore, the third product is unsatisfactory from the standpoint of the present invention. However, it is to be noted that the three products, if combined together, or if obtained originally as a single product weighing 132 grams, would most likely be a satisfactory product, since the undesirable characteristics of the third product would be offset by the superior characteristics of the first and second products.

The invention claimed is:

1. Method for increasing the hardness of partially oxidized microcrystalline wax which comprises: contacting such oxidized wax, containing carboxylic acids formed in situ, in liquid phase with silica gel, thereby to adsorb relatively soft constituents of said oxidized wax on said silica gel; and separating from said silica gel a nonadsorbed, relatively hard fraction of said oxidized wax, the proportions of silica gel and oxidized wax which are contacted being such that said fraction has a saponification number which is at least 60% of that of said oxidized wax.

2. Method according to claim 1 wherein said soft constituents are removed from said gel by washing the gel with a desorbent liquid having substantial solvent action for partially oxidized microcrystalline wax, and wherein said gel is thereafter contacted with additional oxidized wax.

3. Method for increasing the hardness of partially oxidized microcrystalline wax having saponification number in mg. of KOH per gram within the range from 50 to 150, melting point within the range from 180° F. to 210° F. and penetration at 77° F. above 5 which comprises: contacting a charge material consisting essentially of such oxidized wax in liquid phase at a temperature not substantially more than 50 degrees F. above said melting point with silica gel, thereby to adsorb relatively soft constituents of said oxidized wax on said silica gel and separating from said silica gel a non-adsorbed, relatively hard fraction of said oxidized wax, the proportions of silica gel and oxidized wax which are contacted being such that said fraction has a saponification number which is at least 60% of that of said oxidized wax.

4. The method for producing improved partially oxidized microcrystalline wax which comprises: subjecting microcrystalline wax to partial oxidation, subjecting the entire molten reaction mixture from the partial oxidation to contact with silica gel whereby softer constituents of the oxidation reaction mixture are adsorbed, and separating a non-adsorbed fraction of the oxidized wax having a saponification number which is at least 60% of that of the partially oxidized reaction mixture and a penetration number not substantially greater than that of the microcrystalline wax originally charged.

References Cited in the file of this patent

UNITED STATES PATENTS

| 1,885,199 | Hellthaler et al. | Nov. 1, 1932 |
| 2,119,940 | Carr | June 7, 1938 |
| 2,387,171 | Morgan et al. | Oct. 16, 1945 |
| 2,449,402 | Lipkin et al. | Sept. 14, 1948 |
| 2,698,336 | Nelson | Dec. 28, 1954 |

OTHER REFERENCES

Warth: "The Chemistry and Technology of Waxes," pages 240 to 243 (1947), Reinhold Publishing Corp., New York, N. Y.